Oct. 15, 1940.    C. J. HAAG    2,218,467
SPECTACLE AND HINGE THEREFOR
Filed Nov. 4, 1938
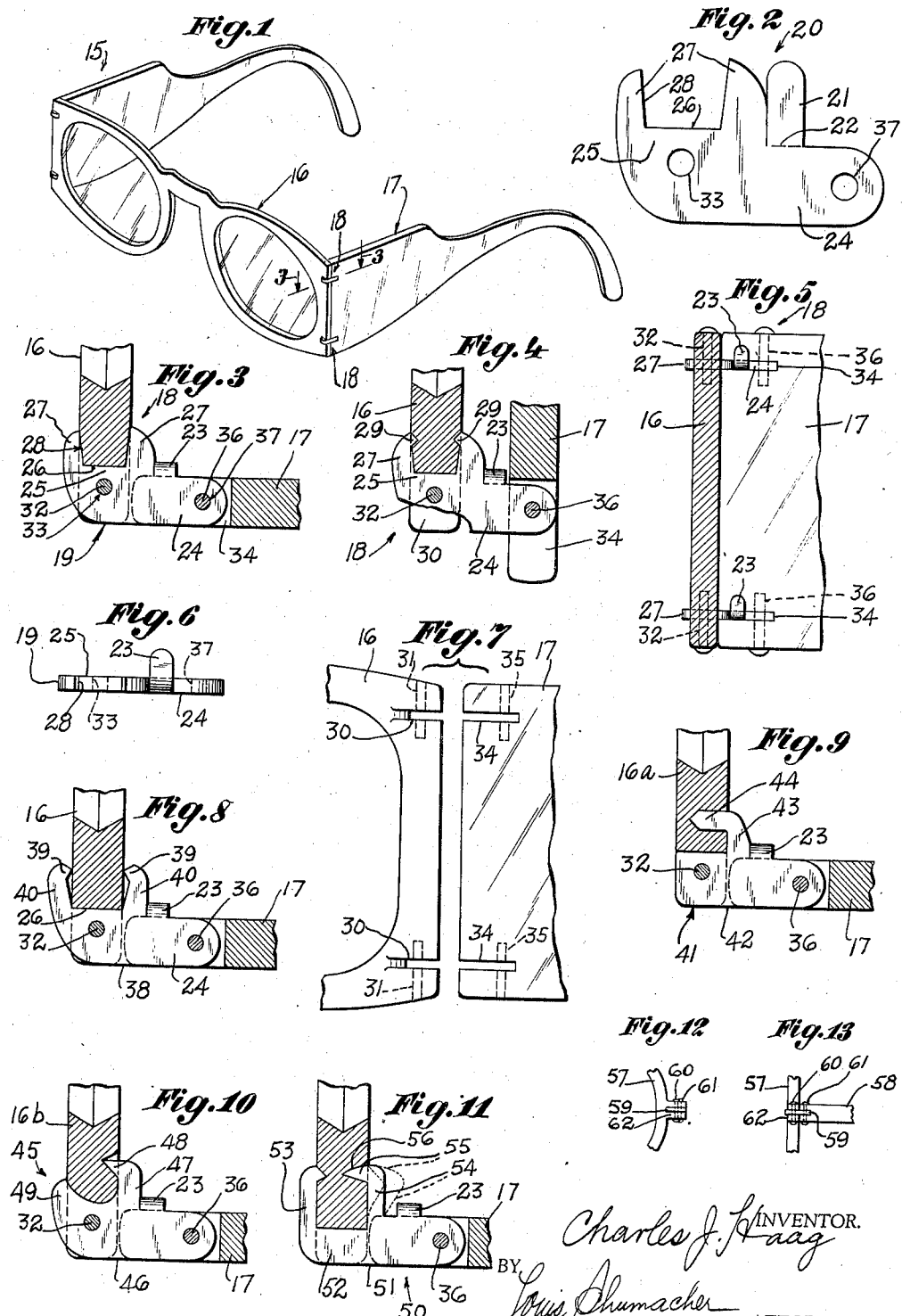
Charles J. Haag INVENTOR.
BY Louis Shumacher ATTORNEY.

Patented Oct. 15, 1940

2,218,467

UNITED STATES PATENT OFFICE 2,218,467

SPECTACLE AND HINGE THEREFOR

Charles J. Haag, Carlstadt, N. J., assignor to Columbia Protektosite Co., Inc., Carlstadt, N. J., a corporation of New Jersey Application November 4, 1938, Serial No. 238,791

2 Claims. (Cl. 88—53)

This invention relates to spectacles and hinges therefor, and likewise to goggles, sunglasses and the like, wherein one or more hinges are used to connect each temple; and more broadly, the invention relates to means and arrangements for hingedly interconnecting different members for relative angular movement to each other.

One object of the invention is to provide a device of the character described having improved simplified hinge means and arrangements adapted particularly to spectacles or goggles, and wherein one or more hinge means may be used for a temple.

To more clearly explain an advantage of the invention, reference will be had to spectacles or goggles that consist of plastic composition material. Heretofore the hinges therefore have generally consisted of hinge elements each having a plurality of ears according to a construction such that the hinge elements had to be milled and put through a series of operations which made these hinges very expensive. Then the hinge elements had to be riveted to the frame and temple, an operation which required care and skill. Sometimes the rivet head would pull out through the rivet holes. For inexpensive spectacles such as goggles, it has been the practice to mold hinge ears directly on the frame and temple, but this structure lacks the neatness and strength of the metallic hinge and created an impression of cheapness which is undesirable in a spectacle or even in a goggle. The art has widely attempted to overcome these difficulties, but the same are unsolved prior to the instant invention.

It is therefore another object of the invention to provide a device which shall overcome the drawbacks above noted and which shall be inexpensive to make and assemble, neat and decorative in appearance, and rugged, durable and efficient in use, so as to withstand the abuses to which spectacle hinges are subjected by undue or unnecessary stresses exerted on the spectacles.

The invention is also applicable, within the scope thereof, for the hinge interconnection of parts unrelated to spectacles, especially where smallness and neatness is essential.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a perspective view of a spectacle, such as a goggle, showing a device embodying the invention.

Fig. 2 is a plan view of a blank from which is made a hinge plate according to the preferred embodiment of the invention.

Fig. 3 is an enlarged sectional view taken on the line 3—3 of Fig. 1.

Fig. 4 is a similar view but with the temple in collapsed position, and the hinge plate modified for a different gripping action on the frame.

Fig. 5 is a fragmentary view of the device with parts in section, showing the invention and particularly the stop element thereof in operative engagement with the temple.

Fig. 6 is an edge view of the hinge plate.

Fig. 7 is a fragmentary view in elevation of the frame and temple showing the slots and pin holes therein.

Fig. 8 is a fragmentary sectional view showing a modified hinge plate prior to being fully secured to the frame.

Figs. 9 and 10 are fragmentary sectional views of other modifications of the hinge plate.

Fig. 11 is a fragmentary sectional view of a further modification of the hinge plate, with a portion thereof shown in initial position in dot-dash lines.

Figs. 12 and 13 are different fragmentary views showing a further modification of the invention with especial reference to a single hinge joint.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Generally described, the invention includes a plurality of members adapted for relative angular movement to each other, said members, or at least one of them, being slotted directly in the body thereof to snugly receive a plate which is hingedly connected to at least one of the members. More specifically, pins embedded directly in the bodies of the members traverse the slots therein so as to directly engage the plate as by passing through the holes therein, one of these pins constituting a pintle. Differently stated, especially where the members are normally at an angle to each other, as in the case of a spectacle frame and its temple, the plate is of angle form with its arms lying in a plane and fitted in one or more of the slots as above indicated, the plate desirably having a stop lug or part at an angle to said plane and lying within the region of the angle of the arms as at the apex of the angle to serve as a stop for the movable member or temple. Preferably the arm secured to the frame is formed with finger means projecting therebeyond to laterally engage the frame or to extend thereinto for connection or securement with the frame and serving as a pin or clamping means for the frame. It will be noted that the plate may be a one piece, easily stamped element which takes the stresses in the plane of its maximum strength. It will be observed that no lugs or hinge ears are formed on the frame or temple and that the hinge plate is free of any unattractive projections, and that the invention also resides in the improved hinge plate referred to.

Referring in detail to the drawing, 15 denotes a device such as a spectacle or goggle embodying the invention and presented herein as an advantageous illustration of the invention. The same may include a frame 16 and temples 17 each connected to the frame by a plurality of hinge means 18. If an ordinary type temple be used, it may be connected to the frame by a single hinge means 18.

The hinge means may comprise a hinge element or plate 19 formed of a blank 20. The former may be exactly like the blank except that the lug 21 which lies in the plane of the blank is downwardly bent along the line 22 to form the stop lug 23 which projects at an angle to the plane of the plate.

It is seen that the hinge plate 19 is angular or comprises a plurality of arms 24, 25 at an angle to each other, according to the angular relation of the frame and temple, these arms lying in a common plane. The arm 25 may terminate in a straight edge 26 in flatwise abutment with the frame 16, or said arm may be regarded as including finger means consisting of spaced fingers 27 formed by the cut out 28 in the end of the arm. These fingers may also be considered as projecting beyond the arm 25 and may have their confronting edges tapered toward each other for a clamping action on the frame when the latter is forced into the cut out 28. If desired, the ends of the fingers 27 may have points or prongs 29 extending toward each other as shown in Fig. 4 to bite into the frame for securely holding the same. If preferred, the frame may be slightly thickened to permit the points 29 to pass over and snap back of the enlargement for secure holding action.

The body of the frame 16 may have a slot 30 therein for snugly receiving a portion of the plate 19, including a portion of the arm 25. Transverse to the slot, the frame may have a bore 31 for receiving a pin 32 which extends through a hole 33 in the arm 25 or in an adjacent part of the plate 19. The arrangement may be such that the pin 32 acts as a taper pin to force the frame between the tapered jaws 27 of the arm 25.

Formed in the temple 17 is a slot 34 and a bore 35 transverse thereto for receiving a pin 36 which extends through the hole 37 of the arm 24, this pin being thus embedded directly in the body of the temple.

It will be noted that the arm 24 has a width equal to the thickness of the temple, whereas the arm 25 is wider than the thickness of the frame so as to allow for the fingers 27. The plate 19 is easily inserted into the open ended slots 30, 34 and secured therein by the pins 32, 36, with the latter serving as a pintle. The stop lug 23 may be extremely small and acts as an inside abutment for the temple to limit outward swinging movement thereof. It is inconspicuous since it lies in the region of the angle between the arms 24, 25 and intermediate of the pins 32, 36.

Since any stress exerted on the hinge plate 19 is taken up in the direction of the plane thereof, being its direction of greatest strength, it is well adapted to sustain any strains. Moreover, since the plate is set into the frame and temple, the hinge connection can resist any reasonable twisting strains. Moreover, hinge lugs and the like need not be molded, and hence the invention is especially advantageous for inexpensive plastic goggles. For high priced spectacles, the hinge is neat, reliable and decorative.

In Fig. 8 is shown a hinge plate 38 which is like that shown in Fig. 4, except that prongs 39 are larger than those at 29, and the fingers 40 are initially flared away from each other so that they may be pressed together to cause the prongs 39 to bite deeply into the frame 16. The prongs may be shaped so as to tend to force the frame toward the edge 26.

In Fig. 9 is shown a hinge 41 including a hinge plate 42 which is like that shown at 19 and 38 except that the arm 25 is formed with only one finger 43, the same lying at the inner face of the frame 16a, and having an enlarged pin or prong 44 which may bite into the frame or extend into a hole initially formed in the frame. This construction has the advantage in that the pin 44 powerfully takes up the clockwise strain exerted on the stop 23.

In Fig. 10 is shown a hinge 45 comprising a hinge plate 46 which differs from those previously shown in having an inner finger 47 pronged at 48 to extend into a depression in the frame, and an outer finger 49 arranged so as to permit the frame 16b to swingably enter between the fingers by a pivotal movement about the prong or projection 48. Thereafter the pin 32 is inserted to permanently lock the hinge plate to the frame.

In Fig. 11 is shown a hinge 50 comprising a hinge plate 51 having an arm 52 comprising pronged fingers 53, 54 adapted for bending relative to each other to clamp the frame in the general manner of Fig. 8, except that the prong 55 on one of these fingers is sufficiently long to constitute a pin so as to eliminate the need for the pin 32. It will be noted that the finger 54 may be bent from the dotted line to the full line position with the prong or pin 55 preferably entering a preformed opening 56 in the frame.

It will now be seen that I have provided devices which fulfill the objects of the invention and are well adapted for practical use.

In Figs. 12 and 13 is shown a spectacle frame 57 having a conventional type of temple 58 and embodying the invention in a single hinge joint structure. The latter may include any hinge plate 59 as shown in Figs. 1 to 10, and represents an improved device in that the pins such as 60, 61 constitute reenforcing tension elements or rivets for the slotted portions of the frame and temple which receive the hinge plate. Accordingly these pins are each formed with heads at their opposite ends. It is noted that the frame 57 is formed with a lug 62 for this purpose, and it is an advantage of this device that such lug may be considerably shorter than heretofore. With the instant improvement spreading of the slotted portions of the frame and temple due to torsional stresses is prevented by the anchor pins 60, 61 that secure the hinge plate 59.

I claim:

1. An ophthalmic hinge mounting including a one piece side portion of a spectacle frame integral with the latter, an adjacent end portion of a temple, and means pivotally interconnecting said portions, said means comprising a one piece plane angle plate, the said frame and temple portions having open ended slots lying along a plane perpendicular to the pivotal axis, each slot being open along its opposite sides substantially from end to end thereof, said plate having its arms fitted in said slots, said frame and temple portions being confined to the respective arms, said plate having holes in the arms thereof, pins extending through said holes and through said adjacent portions of the frame and temple, the arm secured to the frame portion having an integral finger laterally separably engaging the said frame portion to resist angular movement of the plate, the pin in the other arm constituting a hinge pintle for the temple, said plate having an integral lateral lug in the angle between its arms, said lug extending at an angle to the plane of the plate and constituting a stop for the temple portion, said hinge pintle and lug being spaced at a substantial distance apart so that the temple portion can clear the lug when moved to closed position.

2. An ophthalmic hinge mounting including a side portion of a spectacle frame integral with the latter, an adjacent one piece end portion of a temple integral therewith, said frame end portion consisting of molded plastic material, and means pivotally interconnecting said portions, comprising a one piece plane angle plate, said frame and angle portions having open ended slots lying in a plane perpendicular to the pivotal axis, the slot of the frame portion being open along its opposite sides, the first arm of said plate being wholly received in the slot of the frame portion up to the back edge of the plate, said frame portion having generally parallel opposite faces, said first arm having rigid diverging fingers, the frame portion being wedged between said fingers, a pin extending through the first arm and the said frame portion for securing the first arm in the wedged engagement of the fingers, and said temple portion having an opening for receiving the second arm of the plate, and a hinge pintle extending through the second arm and the temple portion, said opening constituting a slot open at its sides and at one end, the second arm having an integral lug at an edge thereof projecting at an angle to the plane of the plate and lying in the angle between the arms, the length of the slot and the distance between the lug and hinge pintle being sufficiently great so that the temple portion clears the lug in its closed position and laterally abuts the lug as a stop in open position, with the end of the temple portion being in substantially direct contact with the frame portion.

CHARLES J. HAAG.